United States Patent
Bhide et al.

(10) Patent No.: US 11,768,939 B2
(45) Date of Patent: Sep. 26, 2023

(54) AUTHENTICATION IN AN UPDATE MODE OF A MOBILE DEVICE

(71) Applicant: International Business Machines Corporation, Armonk, NY (US)

(72) Inventors: Manish Anand Bhide, Hyderabad (IN); Madan K Chukka, Hyderabad (IN); Phani Kumar V. U. Ayyagari, Hyderabad (IN); PurnaChandra Rao Jasti, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

(21) Appl. No.: 17/212,522

(22) Filed: Mar. 25, 2021

(65) Prior Publication Data

US 2022/0309161 A1    Sep. 29, 2022

(51) Int. Cl.
G06F 21/57    (2013.01)
G06F 21/31    (2013.01)
G06F 21/60    (2013.01)
G06F 21/54    (2013.01)

(52) U.S. Cl.
CPC .............. *G06F 21/57* (2013.01); *G06F 21/31* (2013.01); *G06F 21/54* (2013.01); *G06F 21/602* (2013.01)

(58) Field of Classification Search
CPC .......... G06F 21/57; G06F 21/31; G06F 21/54; G06F 21/602
See application file for complete search history.

(56) References Cited

U.S. PATENT DOCUMENTS

| 2003/0005426 A1 | 1/2003 | Scholtens et al. |
| 2010/0162226 A1 | 6/2010 | Borissov et al. |
| 2011/0191568 A1* | 8/2011 | Yamamoto ............ G06F 1/3203 712/30 |
| 2011/0296493 A1* | 12/2011 | Kim ........................ G06F 21/34 726/3 |

(Continued)

FOREIGN PATENT DOCUMENTS

CN    102567062 A    7/2012

OTHER PUBLICATIONS

Mergaerts et al., Upgrading SAP the Comprehensive Guide, 2015.

(Continued)

*Primary Examiner* — Theodore C Parsons
*Assistant Examiner* — Alan L Kong
(74) *Attorney, Agent, or Firm* — Garg Law Firm, PLLC; Rakesh Garg; Edward Wixted

(57) ABSTRACT

An embodiment includes activating, responsive to receiving an update notification, an update mode of a mobile device, wherein the activating of the update mode includes disabling a primary communication interface and enabling a secondary communication interface, and wherein the update notification includes notification of a software update available for the mobile device. The embodiment also includes initiating execution of the software update on the mobile device while the mobile device remains in the update mode. The embodiment also includes deactivating, responsive to completing the software update, the update mode of the mobile device, wherein the deactivating of the update mode includes enabling the primary communication interface and disabling the secondary communication interface.

16 Claims, 7 Drawing Sheets

(56) References Cited

U.S. PATENT DOCUMENTS

| | | | |
|---|---|---|---|
| 2014/0298431 A1* | 10/2014 | Kim | H04W 12/069 |
| | | | 726/5 |
| 2016/0086176 A1 | 3/2016 | Silva Pinto et al. | |
| 2016/0132881 A1* | 5/2016 | Lee | G06Q 20/3278 |
| | | | 705/44 |
| 2016/0189136 A1 | 6/2016 | Mercille | |
| 2018/0063201 A1* | 3/2018 | Zhang | H04L 65/1069 |
| 2018/0293200 A1* | 10/2018 | Hong | G06F 13/4282 |
| 2019/0258472 A1* | 8/2019 | Kim | H04B 5/0031 |
| 2021/0256515 A1* | 8/2021 | Gale | G06Q 20/3827 |
| 2022/0312202 A1* | 9/2022 | Goerbing | H04L 63/08 |

OTHER PUBLICATIONS

Sourceandroid.com, A/B (Seamless) System Updates, Android Open Source Project, Jan. 9, 2020.

IBM.com, Performing a non-disruptive upgrade from PowerHA SystemMirror 7.2.0 to PowerHA SystemMirror 7.2.1, or later, 2020.

* cited by examiner

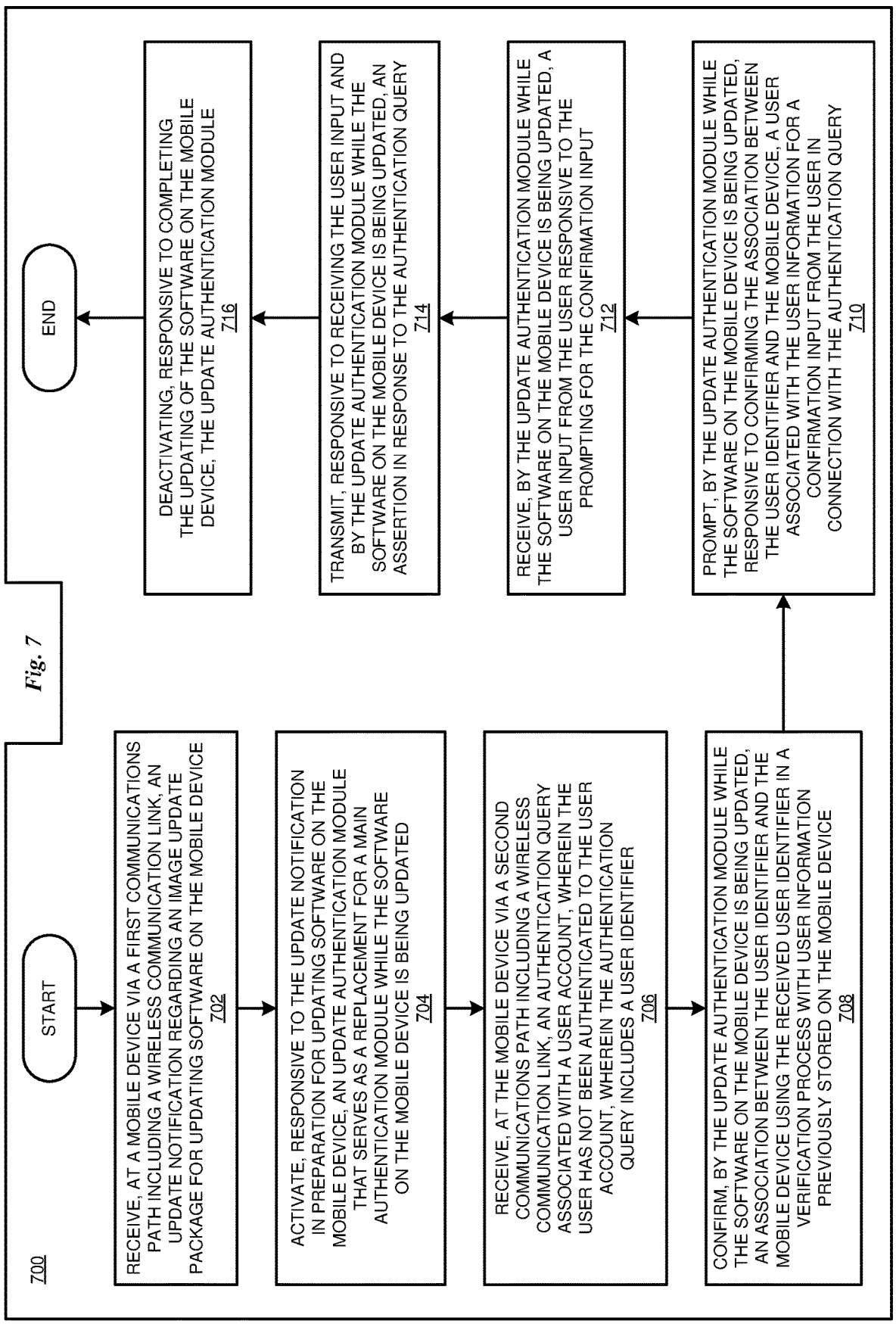

AUTHENTICATION IN AN UPDATE MODE OF A MOBILE DEVICE

BACKGROUND

The present invention relates generally to a method, system, and computer program product for user authentication. More particularly, the present invention relates to a method, system, and computer program product for authentication in an update mode of a mobile device.

Users who engage in online services, such as online banking or commerce, typically must establish credentials for accounts at each service. The credentials allow the user to be authenticated by a service to prevent unauthorized use of the user's account. A common form of authentication involves the use of username and password credentials. Ideally, the user maintains these credentials in secrecy to prevent an unauthorized user from discovering them and using them to gain access to one of the user's online accounts. Nevertheless, if the user's credentials are discovered, the associated account is at risk of being exploited by an unauthorized user.

To mitigate this risk, some authentication techniques require additional or alternative forms of credentials selected to make it more difficult for unauthorized users to gain access to user accounts. For example, two-factor or multi-factor authentication requires a user to input credentials, such as a username and password, followed by a secondary authentication mechanism. An example of a secondary authentication mechanism involves the user providing a dynamic code or password that was sent to the user through an out-of-band mechanism, such as a code sent to the user mobile device via text message or automated phone call. Another example of a secondary authentication mechanism involves confirming some physical characteristic of the user, known as biometrics, such as fingerprint or iris recognition.

SUMMARY

The illustrative embodiments provide for authentication in an update mode of a mobile device. An embodiment includes activating, responsive to receiving an update notification, an update mode of a mobile device, wherein the activating of the update mode includes disabling a primary communication interface and enabling a secondary communication interface, and wherein the update notification includes notification of a software update available for the mobile device. The embodiment also includes initiating execution of the software update on the mobile device while the mobile device remains in the update mode. The embodiment also includes deactivating, responsive to completing the software update, the update mode of the mobile device, wherein the deactivating of the update mode includes enabling the primary communication interface and disabling the secondary communication interface. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 7 depicts a flowchart of an example process for providing for authentication in an update mode of a mobile device in accordance with an illustrative embodiment.

DETAILED DESCRIPTION

Figure 1:
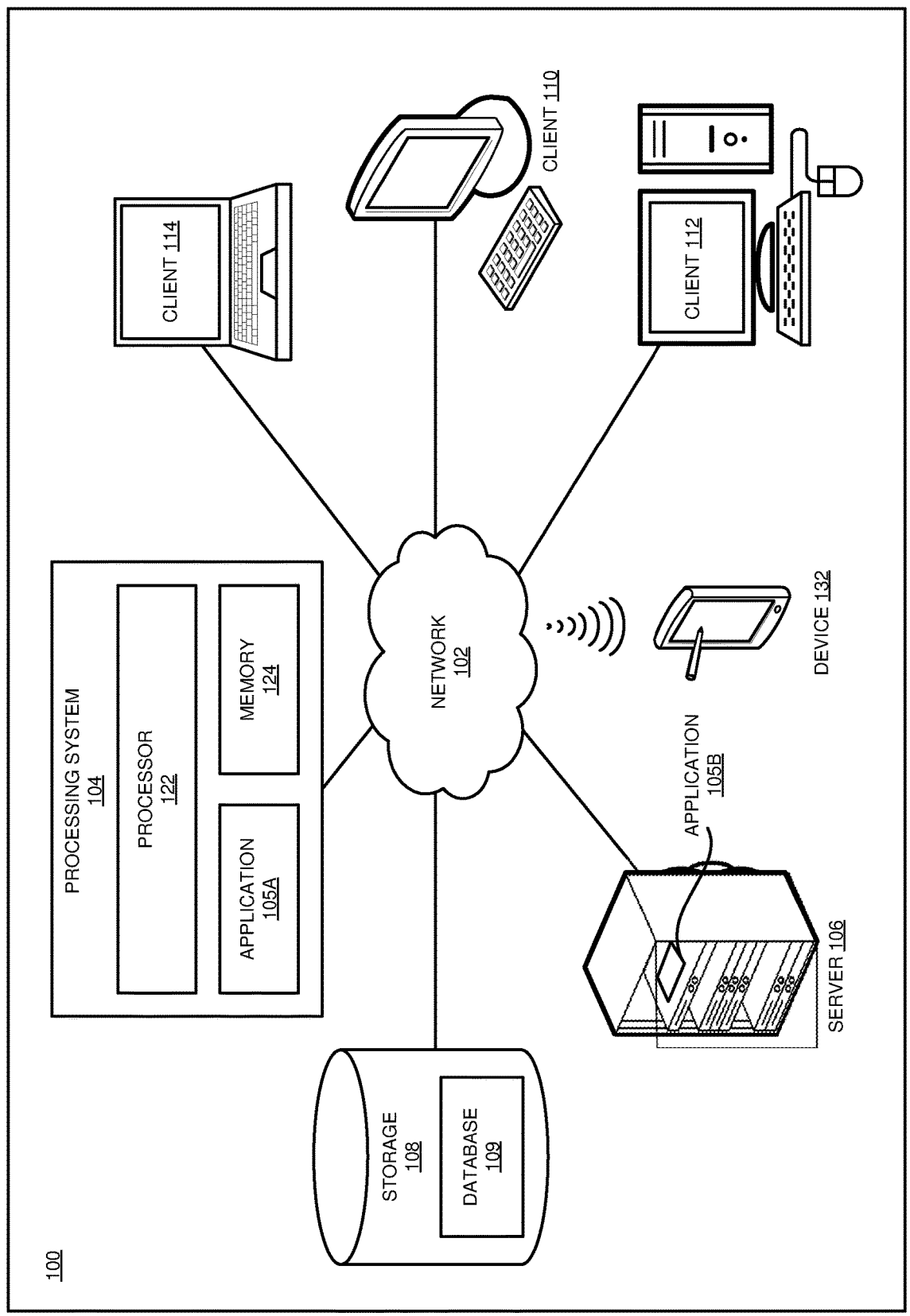
FIG. 1 depicts a block diagram of a network of data processing systems in which illustrative embodiments may be implemented.

Modern mobile phones receive frequent software upgrades to get the latest features or patches. It is particularly important for users to stay current with updates to avoid security concerns or security breaches corrected by the updates. Many mobile phones automate the updating process and attempt to delay the updates to times when the user tends to be inactive (e.g., during overnight hours). However, if the update includes a patch that is related to a vulnerability, the phone often prompts the user immediately to install the update rather than wait for the user's inactive hours.

Users often depend on having uninterrupted use of their mobile phone. This creates a conflict when critical updates become available that are recommended for immediate installation. Examples of critical updates include updates that should be immediately installed because they include a fix for a vulnerability, such as a fix for a software weakness or design deficiency that leaves a mobile phone open to harm or unauthorized exploitation, either externally or internally, thereby resulting in a risk of information compromise, information alteration, service denial, or other unauthorized alteration of the mobile phone. Users are aware that they lose access to their phone during the installation of the update. Users are also sometimes reluctant to install updates because they perceive a risk that something could go wrong during the update that renders their phone inoperable for an extended period of time. Thus, a problem exists in that users would rather delay installation of the update than lose functionality provided by the mobile phone.

This issue is compounded as mobile phones continue to become increasingly integrated into various aspects of every-day life. For example, recent advances in authentication technology adopt the mobile phone as an integral part of a multi-factor authentication process. For example, some web services implement authentication functionality that allows users to use their mobile phones as "authenticators". An authenticator is a cryptographic entity used by a client device to (i) generate a public key credential and register it with a "Relying Party," and (ii) authenticate by potentially verifying the user.

In an embodiment, therefore, the user may utilize an authenticator in the form of, for example, a biometric detection device operating within, connected to, or associated with user's mobile device, and register or authenticate with an authentication server. Examples of biometric authentication methods may include, but are not limited to, speech or voice recognition, fingerprint recognition, face recognition, iris detection, etc.

Thus, a user who has previously had authenticated access to a web service or other secure account by using, for example, facial recognition, may try to log in to the web service using a client device, and then be prompted by their mobile phone to provide a validating input. The client device will not grant access until confirmation is received from the mobile phone.

However, currently if the phone is installing an update while the user is attempting to log in to an account that uses this type of authentication, the user will be unable to gain access to the account at least until the update is completed, and potentially longer if an error occurs during the update. This is because currently, while a software update is in progress, the mobile phone freezes exclusively for the update operation that is in progress and user cannot perform any operations.

This means that users need to plan any urgent or immediate activity on the mobile phone either before or after the upgrade. There is no scope for doing any operation until the upgrade is finished. A typical upgrade will take minimum of 20 to 30 minutes. If the need arises for a user to perform an urgent transaction while the update is installing, it is not currently feasible currently. We propose a system and method where transaction can be done even while your phone is undergoing OS update.

The present application recognizes that this problem of users delaying installation of critical updates by introducing an update mode for a mobile phone that allows certain critical or desirable actions to continue to be performed by the mobile phone while the phone is being updated. For example, in some embodiments, a mobile phone that serves as an authenticator includes an update mode that processes and responds to certain authentication requests while the phone is being updated. This allows the mobile device to continue to operate as an authenticator even while the mobile phone is being updated.

In an illustrative embodiment, an authenticator activates, responsive to receiving an update notification, an update mode of a mobile device, where the activating of the update mode includes disabling a primary authentication module and enabling a secondary authentication module, and where the update notification includes notification of a software update available for the mobile device. The embodiment also includes initiating execution of the software update on the mobile device while the mobile device remains in the update mode. The embodiment also includes deactivating, responsive to completing the software update, the update mode of the mobile device, where the deactivating of the update mode includes enabling the primary authentication module and disabling the secondary authentication module.

The embodiment also includes that the secondary authentication module remains enabled while the update mode is active and the primary authentication module remains inoperable (i.e., not capable of performing normal operations) while the update mode is active. The embodiment also includes that the enabling of the secondary authentication module includes issuing a signal from a main processing unit to an Application Specific Integrated Circuit (ASIC) device. In some embodiments, the secondary authentication module is contained entirely within the ASIC device, and the ASIC device controls the secondary authentication module while the update mode is activated. In some such embodiments, the main processing unit controls the primary authentication module while the update mode is deactivated.

In some embodiments, enabling of the secondary authentication module includes enabling a secondary communication interface and disabling of the secondary authentication module includes disabling the secondary communication interface. In some embodiments, enabling of the primary authentication module includes enabling a primary communication interface and disabling of the primary authentication module includes disabling the primary communication interface.

In some embodiments, the authenticator receives an authentication query associated with a user account via the primary communication interface while the primary communication interface is enabled (i.e., while the update mode is deactivated). In some such embodiments, the authenticator receives an authentication query associated with a user account via the secondary communication interface while the secondary communication interface is enabled (i.e., while the update mode is activated).

In some embodiments, while the update mode is deactivated, the primary authentication module confirms an association between the authenticator and a user identifier received with the authentication query based on user information previously stored on the authenticator. In some such embodiments, while the update mode is activated, the secondary authentication module confirms the association between the authenticator and a user identifier received with the authentication query based on user information previously stored on the authenticator.

In some embodiments, confirming the association includes performing a function on the user identifier. For example, in some embodiments, the function is a mathematical transformation, a cryptographic function, a null function (e.g., the response code is identical to the challenge code), or some other function.

In some embodiments, while the update mode is deactivated, the primary authentication module prompts the user with a request for a confirmation input in connection with the authentication query. In some such embodiments, while the update mode is activated, the secondary authentication module prompts the user with a request for a confirmation input in connection with the authentication query. In some such embodiments, the prompting includes presenting, on a display of the mobile device, a message conveying the request.

In some embodiments, while the update mode is deactivated, the primary authentication module receives a user input in response to the request. In some such embodiments, while the update mode is activated, the secondary authentication module receives a user input in response to the request. In some such embodiments, the user input includes biometric information about the user that is received via a sensor, such as a biometric sensor. In some embodiments, the sensor includes one or more biometric sensors for gathering biometric data associated with a human or an animal. Biometric data is data describing a physiological state, physical attribute, or measurement of a physiological condition. Biometric data may include, without limitation, fingerprints, thumbprints, palm prints, footprints, hear rate, retinal patterns, iris patterns, pupil dilation, blood pressure, respiratory rate, body temperature, blood sugar levels, and any other physiological data. In some embodiments, sensor(s) include, without limitation, fingerprint scanners, palm scanners, thumb print scanners, retinal scanners, iris scanners, wireless blood pressure monitor, heart monitor, thermometer or other body temperature measurement device, blood sugar monitor, microphone capable of detecting heart beats and/or breath sounds, a breathalyzer, or any other type of biometric device.

In some embodiments, while the update mode is deactivated, the primary authentication module transmits an assertion by the primary communication interface in response to the authentication query. In some such embodiments, while the update mode is activated, the secondary authentication module transmits an assertion by the secondary communication interface in response to the authentication query.

In an embodiment, a relying party, such as a website, a web-based application, or a native application, is accessible to a user on a client computing platform (also referred to herein as a client device), such as desktop or laptop computer, a tablet computer, or an Internet of things (IoT) device. The relying party then sends an authentication assertion request to an authenticator. An assertion may include any kind of data that the relying part uses to make access-control decisions. For example, the assertion may include evidence that the user interacted with another hardware device that is known to be associated with the user, such as a smartphone, that is physically distinct from the computing platform and serves as a mobile authenticator (also referred to as a roaming authenticator). The mobile authenticator includes a mechanism to obtain an input from the user such that the user input provides evidence of user interaction. For example, embodiments of the mobile authenticator include a mechanism to receive an input from the user by receiving a gesture that activates a consent button or other user interface (UI) element, receiving a password, receiving a Personal Identification Number (PIN), receiving biometric information via a biometric sensor, such as a fingerprint or iris identifier, or a combination of these.

In some embodiments, the mobile authenticator and the client device communicate with each other using a confidential and mutually authenticated data transport channel. In some embodiments, the mobile authenticator and the client device communicate with each other using Bluetooth® (BLUETOOTH® is a registered trademark of Bluetooth SIG, Inc., Kirkland, Wash., U.S.A.), Bluetooth Low Energy (BLE), near-field communication (NFC), or other communication channel facilitated by a primary or secondary communication interface on the mobile authenticator. In some embodiments, the mobile authenticator has a primary communication interface that communicates with the client device during ordinary operations and has a secondary communication interface that communicates with the client device during periods when the primary communication interface is unavailable. In some such embodiments, internal to the mobile authenticator, the primary communication interface is in communication with a primary authentication module and the secondary communication interface is in communication with a secondary authentication module. The primary authentication module provides authentication services for the client device during ordinary operations and the secondary authentication module provides authentication services for the client device during periods when the primary authentication module is unavailable.

An example of a period during which the primary communication device and the primary authentication module are unavailable is during a software update, such as an operating system update. Thus, in some embodiments, the secondary communication interface and the secondary authentication module are active during software updates that render the primary communication interface and the primary authentication module unavailable.

In some embodiments, the mobile authenticator operates in a single-factor mode in which the mobile authenticator tests for user presence, for example by displaying a user prompt requesting the user to provide an input, for example by tapping a confirmation button. In other embodiments, the mobile authenticator operates in a multi-factor mode in which the mobile authenticator prompts a user to input something the user knows (e.g., a password or PIN) or something the user is (e.g., biometric information such as a fingerprint or iris identifier).

In some embodiments, the relying party uses the WebAuthn (Web Authentication) API for authenticating the user to the application using public-key cryptography. The public-key cryptography uses a public key to verify a signature created by a private key. In some such embodiments, the private key is stored on the mobile authenticator. In an embodiment, the mobile authenticator is a FIDO2 ("Fast IDentity Online"2) authenticator that implements the CTAP2 ("Client to Authenticator Protocol"2) protocol.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
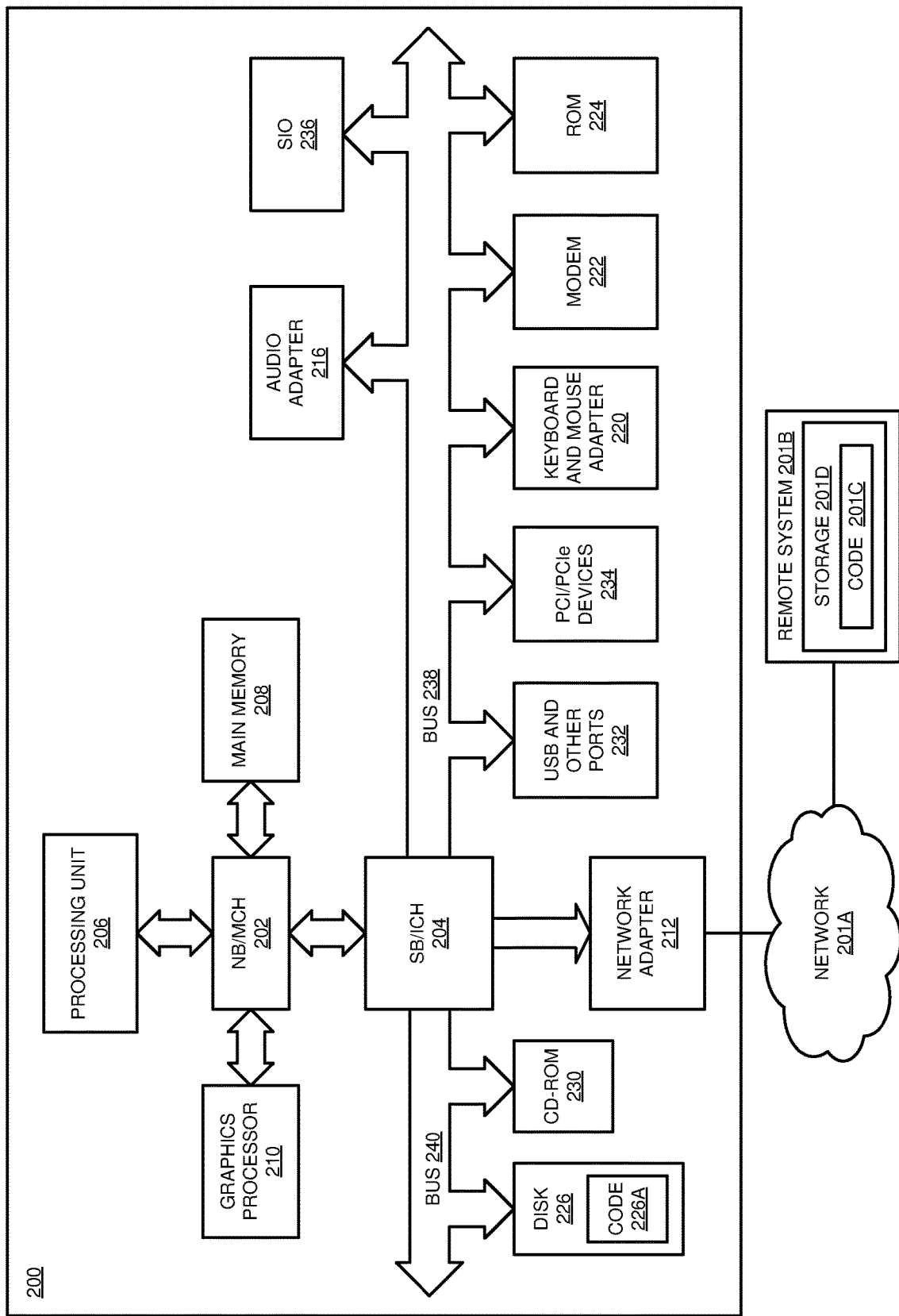
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a data processing system. In an embodiment, server 106 includes processing elements of a relying party application 105B, such as a website or other a web-based application, that may be configured to interact with one or more of the processor functions described herein in accordance with one or more embodiments.

Client computing platforms 110, 112, and 114 are also coupled to network 102. A data processing system, such as server 106, or client computing platform 110, 112, or 114 may contain data and may have software applications or software tools executing conventional computing processes thereon in addition to embodiments described herein.

Only as an example, and without implying any limitation to such architecture, FIG. 1 depicts certain components that are usable in an example implementation of an embodiment. For example, server 106, and client computing platforms 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments.

Device 132 is an example of a mobile authenticator described herein. For example, device 132 can take the form of a mobile phone or smartphone. Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, a biometric sensor, a semiconductor device, for example an FPGA device, for implementing an update mode device according to embodiments described herein, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
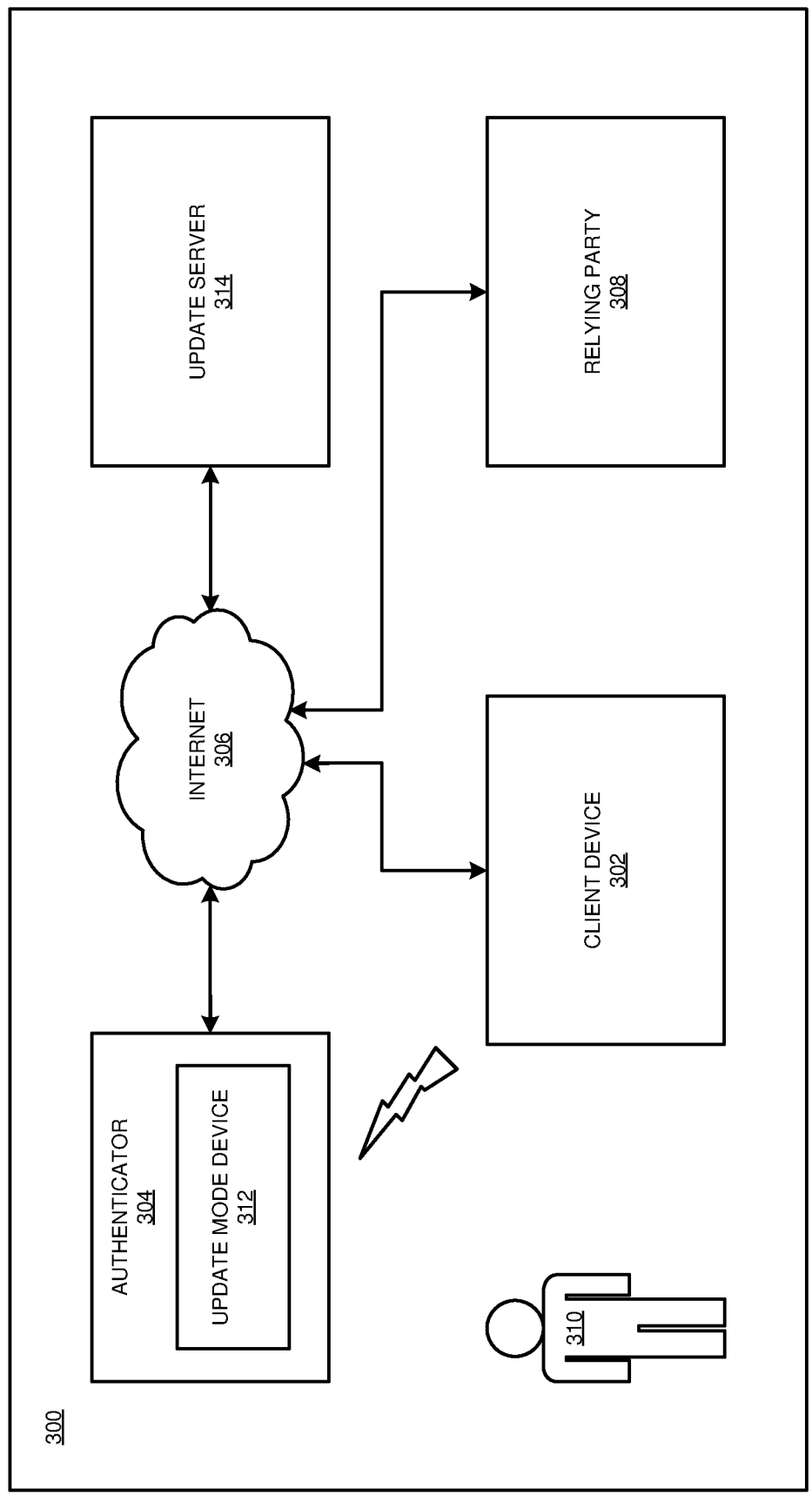
FIG. 3 depicts a block diagram of an example environment in which an authentication application may be implemented in accordance with an illustrative embodiment.

With reference to FIG. 3, this figure depicts a block diagram of an example environment 300 in which an authentication application may be implemented in accordance with an illustrative embodiment. In the illustrated embodiment, a user 310 uses a client device 302 to access the user's secure account operated by a relying party 308. In some embodiments, the relying party 308 is a website, a web-based application, or a native application that includes remote elements. In some embodiments, the client device 302 is a client computing platform, such as desktop or laptop computer, a tablet computer, or an Internet of things (IoT) device.

In the illustrated embodiment, the user 310 tries to login to his secure account using the client device 302. The client device 302 sends the login request to the relying party 308. The relying party 308 responds with instructions for the user 310 to take some action using an authenticator 304 that the user 310 has previously established as being a separate hardware device that is associated with the user. In some embodiments, the authenticator 304 is a smartphone or other hardware device that is physically distinct from the client device 302. The authenticator 304 prompts the user to take some action to complete authentication. Examples of the action requested of the user can vary, and may include such things as a gesture by the user to activate a button or other user interface (UI) element, or may require the user to input a password, a PIN, or biometric information. Once the user 310 takes the requested action, the relying party 308 receives confirmation of the user action and authenticates the user 310 so that the user 310 will be logged in.

In the illustrated embodiment, the client device 302 and relying party 308 communicate via the Internet 306. Also, the authenticator 304 communicates with an update server 314 via the Internet 306. The authenticator 304 and the client device 302 communicate with each other using a confidential and mutually authenticated data transport channel. In some embodiments, the authenticator 304 and the client device 302 communicate with each other using Bluetooth Low Energy (BLE), near-field communication (NFC), or other communication channel.

In the illustrated embodiment, the authenticator 304 periodically receives a software update from the update server 314. During the period of time while the authenticator 304 installs the update, the primary authentication functionality is unavailable. The authenticator 304 activates an update mode device 312 that provides a secondary authentication functionality while the authenticator 304 is installing a software update. Thus, the update mode device 312 allows the user 310 to complete a login or other authentication process even while the authenticator 304 would otherwise be unavailable. In some embodiments, the update mode device 312 is an Application Specific Integrated Circuit ("ASIC") device. Examples of ASIC devices that may be used as the update mode device 312 include, but are not limited to, Field Programmable Gate Arrays ("FPGAs") or other field programmable devices ("FPDs") or programmable logic devices ("PLDs").

Figure 4:
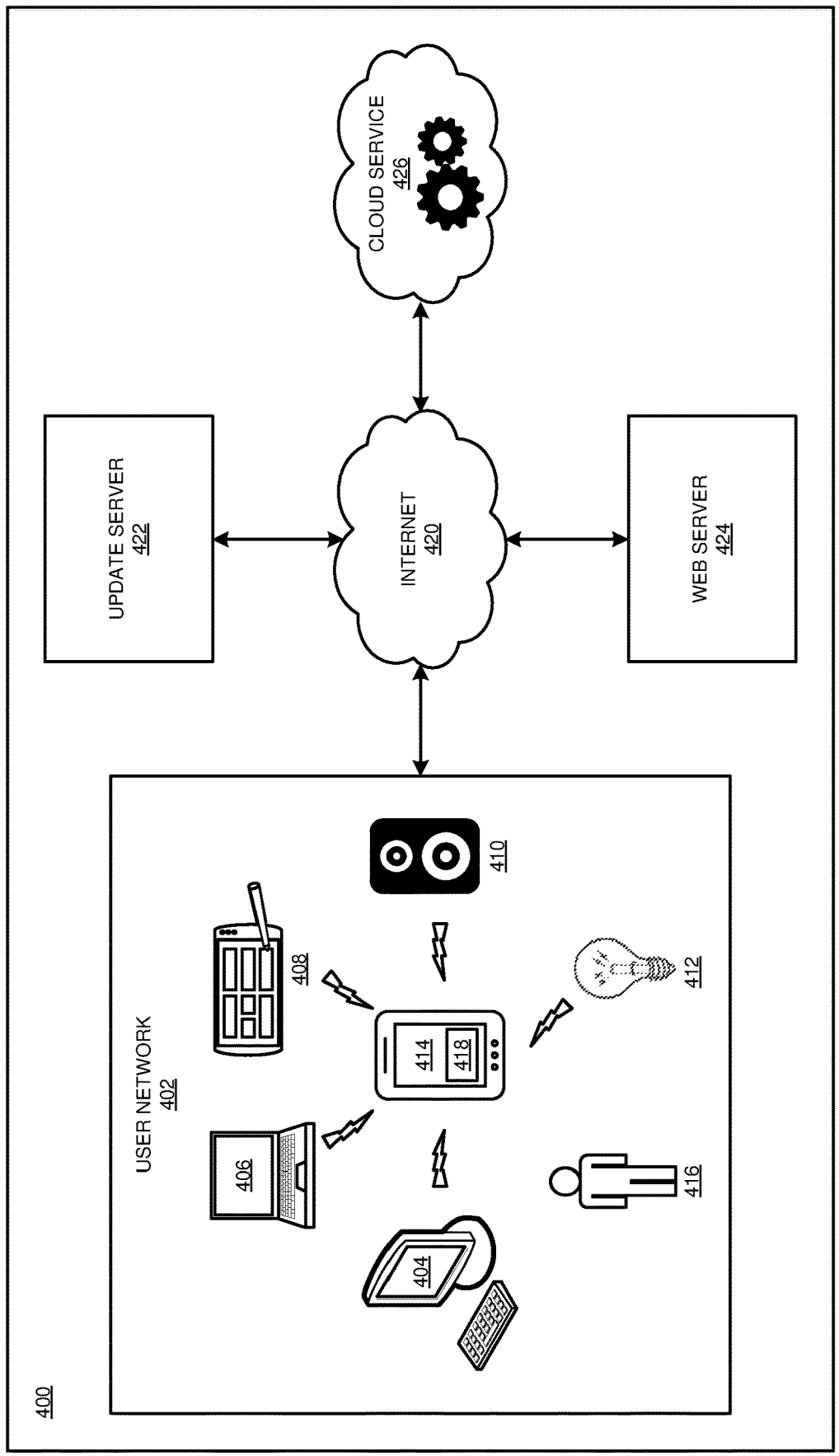
FIG. 4 depicts a block diagram of an example environment in which an authentication application may be implemented in accordance with an illustrative embodiment.

With reference to FIG. 4, this figure depicts a block diagram of an example environment 400 in which an authentication application may be implemented in accordance with an illustrative embodiment. In the illustrated embodiment, a user 416 having a user network 402 uses an authenticator 414 for completing authentication initiated through any of a variety of client devices, such as a desktop computer 404, a laptop computer 406, a tablet computer 408, and any of a variety of IoT devices, such as a smart speaker 410 or a smart lightbulb 412. a smart speaker a client device 302 to access the user's secure account operated by a relying party 308. In the illustrated embodiment, the user 416 may be authenticating to any of a variety of different types of relying party devices, such as a web server 424 or cloud service 426 via the Internet 420. In some embodiments, the relying party 308 is a website, a web-based application, or a native application that includes remote elements. In some embodiments, the client device 302 is a client computing platform, such as desktop or laptop computer, a tablet computer, or an Internet of things (IoT) device.

In the illustrated embodiment, the authenticator 414 is a mobile phone that periodically receives a software update from an update server 422. During the period of time while the authenticator 414 installs the update, the primary authentication functionality is unavailable. The authenticator 414 activates an update mode device 418 that provides a secondary authentication functionality while the authenticator 414 is installing a software update. Thus, the update mode device 418 allows the user 416 to complete a login or other authentication process even while the authenticator 414 would otherwise be unavailable. In some embodiments, the update mode device 418 is an Application Specific Integrated Circuit ("ASIC") device. Examples of ASIC devices that may be used as the update mode device 418 include, but are not limited to, Field Programmable Gate Arrays ("FPGAs") or other field programmable devices ("FPDs") or programmable logic devices ("PLDs").

Figure 5:
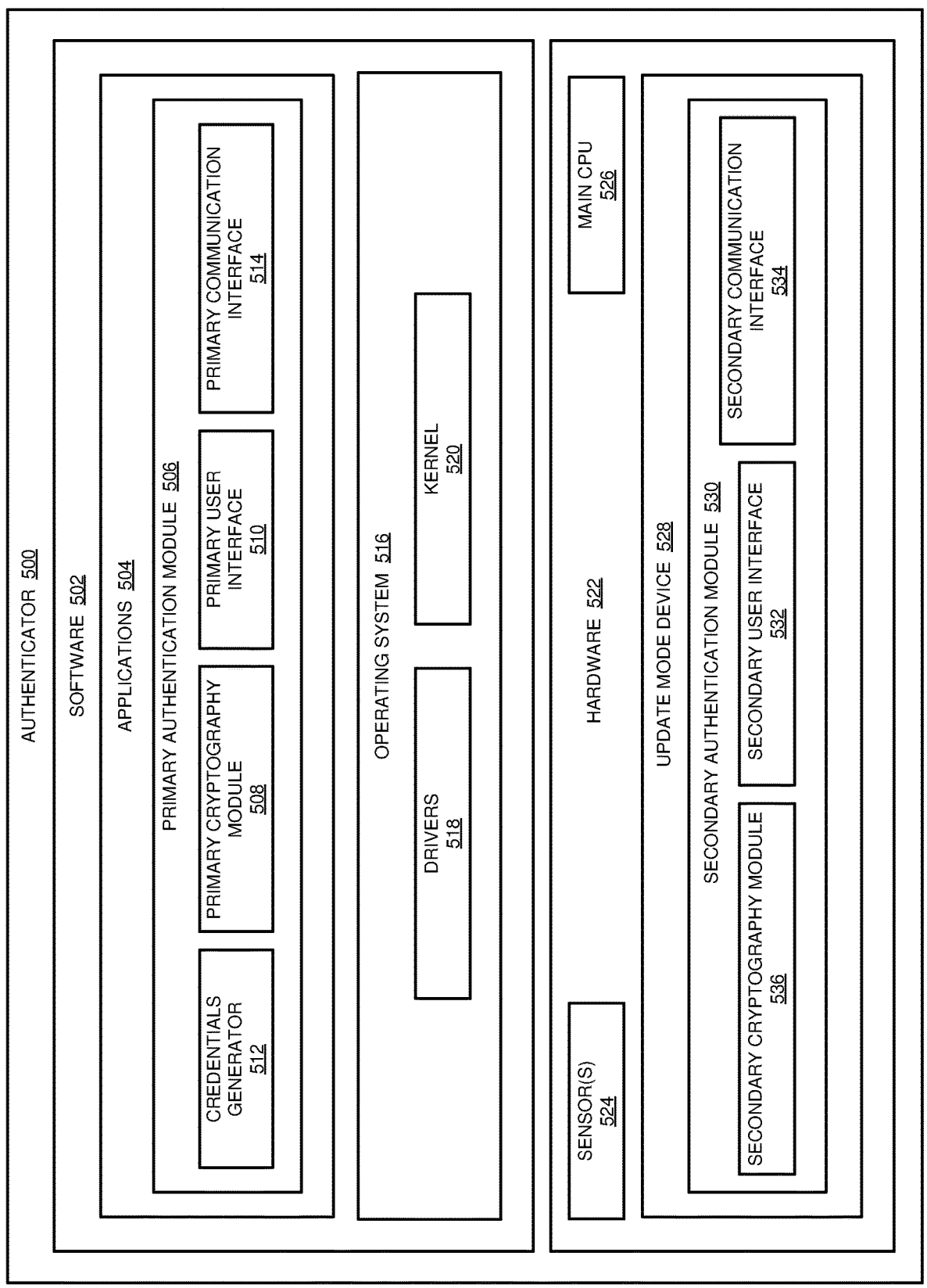
FIG. 5 depicts a block diagram of an authenticator in accordance with an illustrative embodiment.

With reference to FIG. 5, this figure depicts a block diagram of an authenticator 500 in accordance with an illustrative embodiment. The authenticator 500 is an example of the authenticator 304 of FIG. 3 or the authenticator 414 of FIG. 4.

In the illustrated embodiment, the authenticator 500 includes software 502 and hardware 522. The illustrated software 502 and hardware 522 blocks are non-limiting groupings of elements of embodiments of the authenticator 500 and are not intended to imply strict delineations between software and hardware components. In some embodiments, elements illustrated within the software 502 include hardware and/or elements illustrated within the hardware 522 include software.

In the illustrated embodiment, the software 502 includes applications 504 and an operating system 516. The applications 504 include a primary authentication module 506. The primary authentication module 506 is implemented as hardware, software or a combination of both hardware and software, and includes a credentials generator 512, a primary cryptography module 508, a primary user interface 510, and a primary communication interface 514.

In some embodiments, the credentials generator 512 is a software module that generates a new key pair in response to a credentials request from a client device, such as client device 302 of FIG. 3. In some embodiments, the credentials generator 512 generates a new credential (e.g., a new private key/public key pair) responsive to receiving a request for a new credential from a client device via the primary communication interface 514. In some such embodiments, the credentials generator 512 generates a cryptographic key pair as the new credential. In some embodiments, before generating the new credentials, the credentials generator 512 verifies a parameter received with the request using the primary user interface 510 to perform user verification (e.g., requesting the user to input a password, a PIN, or biometric information) or a user presence check (e.g., requesting the user to activate a button or other user interface (UI) element). In some embodiments, the credentials generator 512 requests cryptographic calculations or processes from the primary cryptography module 508 in order to generate a cryptographic key pair.

In some embodiments, the primary cryptography module 508 is a software module that uses any of several known encryption algorithms to encrypt and decrypt data. As a non-limiting example, in some embodiments, the primary cryptography module 508 uses the Rivest-Shamir-Adleman (RSA) encryption algorithm to encrypt and decrypt data. In some embodiments, the primary cryptography module 508 performs encryption of outgoing data prior to the outgoing data being transmitted or stored in memory. In some embodiments, the primary cryptography module 508 performs decryption of incoming data after the data is received or fetched from memory.

In some embodiments, the primary user interface 510 is implemented as hardware, software or a combination of both hardware and software. In some embodiments, the primary user interface 510 includes a graphical user interface (GUI), a command line interface, and/or a touch-sensitive display, sometimes referred to as a "touch screen" for convenience. In some embodiments, the primary user interface 510 allows a user to submit information associated with obtaining authenticated access to a new or existing web service or other secure account. As non-limiting examples, embodiments of the primary user interface 510 allow a user to log in to a web service using the authenticator 500, for example by responding to a prompt on the primary user interface 510 to provide a validating input, such as user account credentials.

In some embodiments, the primary communication interface 514 is implemented as hardware, software or a combination of both hardware and software. In some embodiments, primary communication interface 514 includes radio interface hardware components to facilitate communications via one or more different radio frequency (RF) technologies and protocols. For example, in some embodiments, the primary communication interface 514 includes one or more radio interface hardware components supporting interconnection or network interface components or other suitable devices to communicate with one or more peripheral devices, mobile phones, databases, remote servers (e.g., web servers hosting websites), and client computing platforms via radio frequency (RF) communications. For example, in some embodiments, the primary communication interface 514 includes hardware and software elements of wired communication components (e.g., for coupling via USB), wireless cellular communication components, wireless NFC components, Bluetooth® (or Bluetooth® Low Energy) components, and/or Wi-Fi components.

In the illustrated embodiment, the operating system 516 includes drivers 518 and kernel 520. The hardware 522 includes sensor(s) 524, main CPU 526, and an update mode device 528. The update mode device 528 includes a secondary authentication module 530. The secondary authentication module 530 is implemented as hardware, software or a combination of both hardware and software, and includes a secondary cryptography module 536, a secondary communication interface 534, and a secondary user interface 532.

In some embodiments, the descriptions of the primary cryptography module 508, primary communication interface 514, and primary user interface 510 apply equally to the secondary cryptography module 536, secondary communication interface 534, and secondary user interface 532, respectively. In some embodiments, the secondary cryptography module 536 is a software module, the secondary communication interface 534 is implemented as hardware, software or a combination of both hardware and software, and secondary user interface 532 is implemented as hardware, software or a combination of both hardware and software.

In some embodiments, the description of the secondary cryptography module 536 is substantially the same as the description of the primary cryptography module 508, with the primary differences being that the secondary cryptography module 536 lacks some of the functionality of the primary cryptography module 508. For example, in some embodiments, the secondary cryptography module 536 lacks functionality related to generates a cryptographic key pair as the new credential.

In some embodiments, the description of the secondary communication interface 534 is substantially the same as the description of the primary communication interface 514, with the primary differences being that the secondary communication interface 534 lacks some of the functionality of the primary communication interface 514. For example, in some embodiments, the secondary communication interface 534 lacks hardware and software elements of wireless cellular communication components. In some embodiments, the primary communication interface 514 and the secondary communication interface 534 share one or more hardware components, but control the shared hardware components with respective different hardware and/or software components. For example, in some embodiments, the primary communication interface 514 and secondary communication interface 534 both use the same physical Bluetooth antenna, or both use the same physical Wi-Fi antenna, but do so with respective different Bluetooth or Wi-Fi transceivers. Alternatively, in some embodiments, the primary communication interface 514 and secondary communication interface 534 both use the same physical combination Bluetooth/Wi-Fi antenna, but do so with respective different combination Bluetooth/Wi-Fi transceivers.

In some embodiments, the description of the secondary user interface 532 is substantially the same as the description of the primary user interface 510, with the primary differences being that the secondary user interface 532 lacks some of the functionality of the primary user interface 510. In some embodiments, the primary user interface 510 and the secondary user interface 532 share one or more hardware components, but control the shared hardware components with respective different drivers. For example, in some embodiments, the primary user interface 510 and secondary user interface 532 both drive a same physical display panel, but do so with respective different display drivers. For example, in some embodiments, the secondary user interface 532 of the secondary authentication module 530 lacks one or more display resolution options that are available from the primary user interface 510 of the primary authentication module 506. In some embodiments, the update mode device 528 is an ASIC or other such electronic device that includes a slower or lower-performing processor (which performs processing for the secondary user interface 532 of the secondary authentication module 530) compared to the main CPU 526 (which performs processing for the primary user interface 510 of the primary authentication module 506). Thus, in some such embodiments, the resolution of the secondary user interface 532 is reduced based on performance considerations, i.e., avoid overworking the processing capabilities of the update mode device 528. The exact differences in resolution would be based on several implementation-specific considerations.

In alternative embodiments, the authenticator 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the authenticator 500 activates an update mode in response to receiving an update notification that includes notification of a software update available for the mobile device. In some embodiments, the authenticator 500 activates the update mode by disabling the primary authentication module 506 and enabling the secondary authentication module 530. In some embodiments, the authenticator 500 initiates execution of the software update while the authenticator 500 is in the update mode and remains in the update mode until the update is complete. In some embodiments, the authenticator 500 deactivates the update mode of the mobile device in response to completing the software update. In some embodiments, the authenticator 500 deactivates the update mode by enabling the primary authentication module 506 and disabling the secondary authentication module 530.

In some embodiments, the secondary authentication module 530 remains enabled while the update mode is active and the primary authentication module 506 remains inoperable while the update mode is active. In some embodiments, the authenticator 500 enables the secondary authentication module 530 by a process that includes the main CPU 526 issuing a signal to the enable the update mode device 528. In some embodiments, the CPU 526 enables the secondary authentication module 530 by a process that includes transmitting user authentication data from the primary authentication module 506 to the secondary authentication module 530. For example, in some embodiments, the primary authentication module 506 stores user credentials, and transmits a copy of the stored user credentials to the secondary authentication module 530 as part of the enabling of the secondary authentication module 530. In some embodiments, the update mode device 528 includes an ASIC device, for example an FPGA, FPD, or PLD. In some embodiments, the secondary authentication module 530 is contained entirely within the update mode device 528. In some embodiments, the update mode device 528 controls the secondary authentication module 530 while the update mode is activated, and the main CPU 526 controls the primary authentication module 506 while the update mode is deactivated.

In some embodiments, the authenticator 500 enables the secondary authentication module 530 by a process that includes enabling the secondary communication interface 534, and the authenticator 500 disables the secondary authentication module 530 by a process that includes disabling the secondary communication interface 534. In some embodiments, the authenticator 500 enables the primary authentication module 506 by a process that includes enabling the primary communication interface 514, and the authenticator 500 disables the primary authentication module 506 by a process that includes disabling the primary communication interface 514.

In some embodiments, the authenticator 500 receives an authentication query associated with a user account via the primary communication interface 514 while the primary communication interface 514 is enabled (i.e., while the update mode is deactivated) or via the secondary communication interface 534 while the secondary communication interface 534 is enabled (i.e., while the update mode is activated).

In some embodiments, while the update mode is deactivated, the primary authentication module 506 confirms an association between the authenticator 500 and a user identifier received with the authentication query based on user information previously stored on the authenticator 500. In some such embodiments, while the update mode is activated, the secondary authentication module 530 confirms the association between the authenticator 500 and a user identifier received with the authentication query based on user information previously stored on the authenticator 500.

In some embodiments, confirming the association includes performing a function on the user identifier by the primary cryptography module 508 while the update mode is inactive or by the secondary cryptography module 536 while the update mode is active. For example, in some embodiments, the function is a mathematical transformation, a cryptographic function, a null function (e.g., the response code is identical to the challenge code), or some other function.

In some embodiments, while the update mode is deactivated, the primary authentication module 506 prompts the user with a request for a confirmation input in connection with the authentication query. In some such embodiments, while the update mode is activated, the secondary authentication module 530 prompts the user with a request for a confirmation input in connection with the authentication query. In some such embodiments, the prompting includes presenting, on a display of the mobile device, a message conveying the request.

In some embodiments, while the update mode is deactivated, the primary authentication module 506 receives a user input via primary user interface 510 in response to the request. In some such embodiments, while the update mode is activated, the secondary authentication module 530 receives a user input via secondary user interface 532 in response to the request. In some such embodiments, the user input includes biometric information about the user that is received via a sensor 524, such as a biometric sensor. In some embodiments, the sensor 524 includes one or more biometric sensors for gathering biometric data associated with a human or an animal. Biometric data is data describing a physiological state, physical attribute, or measurement of a physiological condition. Biometric data may include, without limitation, fingerprints, thumbprints, palm prints, footprints, hear rate, retinal patterns, iris patterns, pupil dilation, blood pressure, respiratory rate, body temperature, blood sugar levels, and any other physiological data. In some embodiments, sensor(s) 524 include, without limitation, fingerprint scanners, palm scanners, thumb print scanners, retinal scanners, iris scanners, wireless blood pressure monitor, heart monitor, thermometer or other body temperature measurement device, blood sugar monitor, microphone capable of detecting heart beats and/or breath sounds, a breathalyzer, or any other type of biometric device.

In some embodiments, while the update mode is deactivated, the primary authentication module 506 transmits an assertion by the primary communication interface 514 in response to the authentication query. In some such embodiments, while the update mode is activated, the secondary authentication module 530 transmits an assertion by the secondary communication interface 534 in response to the authentication query.

Figure 6:
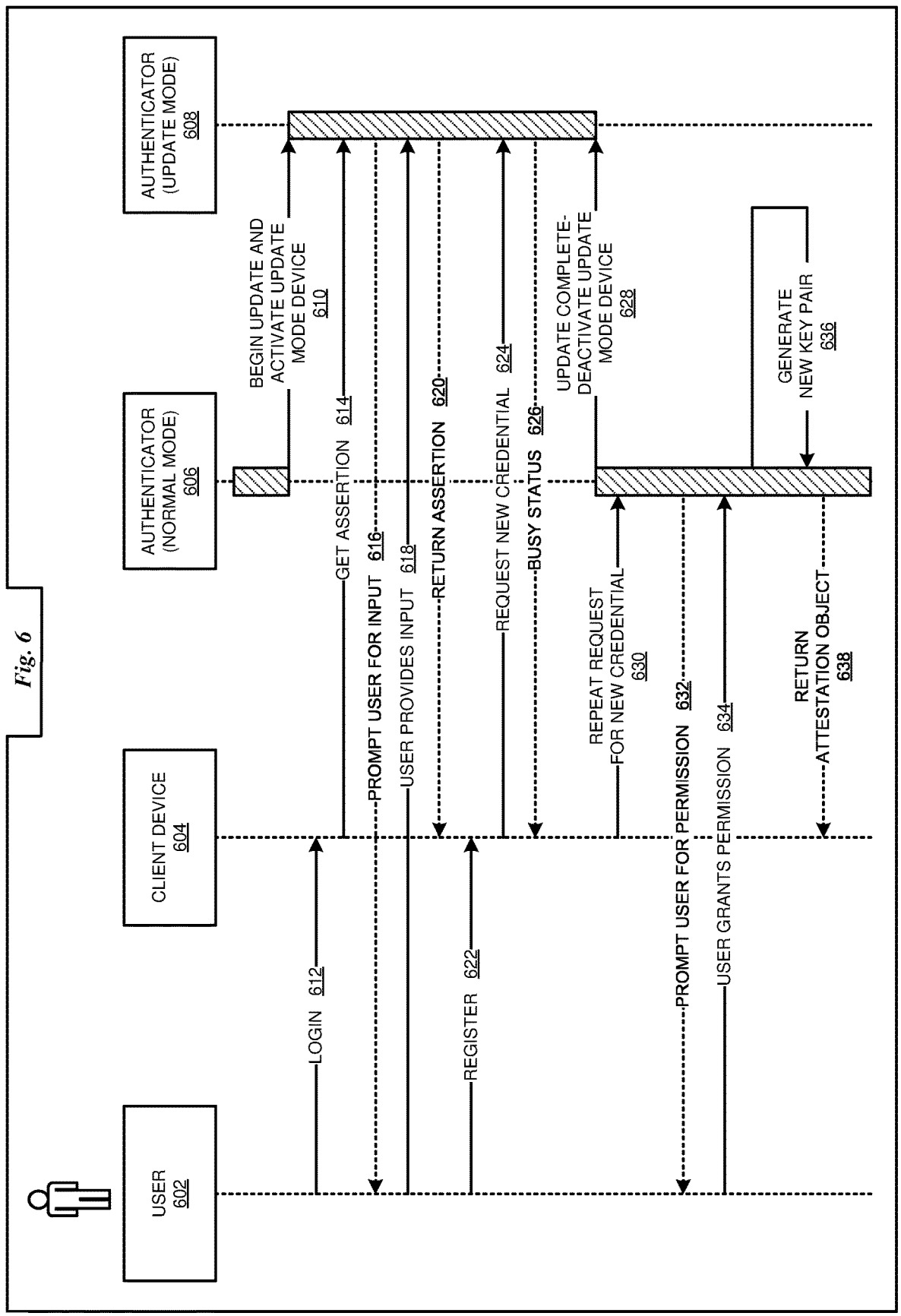
FIG. 6 depicts a timing diagram illustrating example data flows in accordance with one or more example embodiments.

With reference to FIG. 6, this figure depicts a timing diagram illustrating example data flows in accordance with one or more example embodiments. In particular, FIG. 6 depicts an example scenario in which a secondary authenticator 608 includes less than all of the functionality of a primary authenticator 606. In an embodiment, the client device 604 is an example of client device 302 of FIG. 3, or any one of client devices 404-412 of FIG. 4, and authenticator 606/608 is an example of authenticator 304 of FIG. 3, authenticator 414 of FIG. 4, or authenticator 500 of FIG. 5.

In the illustrated embodiment, a user 602 submit a login request 612 to the client device 604. The client device 604 then sends an assertion request 614 to an authenticator 606/608. The authenticator 606/608 began a software update and activated an update mode at 610 just prior to receiving the assertion request. Thus, the assertion request is received by the update-mode authenticator 608. The authenticator 608 responds to the assertion request by issuing a prompt 616 the user 602 to take some action to complete authentication. Examples of the action requested of the user can vary, and may include such things as a gesture by the user to activate a button or other user interface (UI) element, or may require the user to input a password, a PIN, or biometric information. Once the user 602 takes the requested action by providing the requested input 618, the authenticator 608 receives confirmation of the user action and, in response, issues the requested authentication assertion 620 to the client device 604.

Next, in the illustrated embodiment, the user 602 issues a registration request 622 to the client device 604 for registering a new account. The client device 604 responds by issuing a request 624 for a new credential. The authenticator 606/608 is still installing an update, so the request 624 is received by the update-mode authenticator 608. However, in the illustrated embodiment, the update-mode authenticator 608 is a scaled-down version of the normal-mode authenticator 606 such that the update-mode authenticator 608 includes less functionality than the normal-mode authenticator 606. As an example, in the illustrated embodiment, the update-mode authenticator 608 lacks functionality for creating new accounts, so the update-mode authenticator 608 is not capable of responding to the new credential request 624. For this reason, the update-mode authenticator 608 sends a busy status 626 back to the client device 604. In some embodiments, the client device 604 responds to a busy status by waiting a predetermined period of time and then repeating the request 624 as a repeat request 630. However, between the busy status message 626 and the repeat request 630, the authenticator 606/608 finished installing the software update and issued an update complete/deactivate update mode device message 628 to the authenticator 608, thereby disabling update mode and transitioning the handling of authentication processing to the authenticator 606. Thus, the repeat request 630 is received by the authenticator 606, which includes the functionality for creating new accounts that is lacking in the update-mode authenticator 608. The authenticator 606 issues a prompt 632 for user permission, to which the user 602 responds with permission 634 to the authenticator 606. The authenticator 606 generates a new key pair at 636, and returns an attestation object 638 to the client device 604.

With reference to FIG. 7, this figure depicts a flowchart of an example process 700 for providing for authentication in an update mode of a mobile device in accordance with an illustrative embodiment. In a particular embodiment, process 700 is carried out by the of authenticator 304 of FIG. 3, authenticator 414 of FIG. 4, or authenticator 500 of FIG. 5.

In the illustrated embodiment, at block 702, the process receives an update notification regarding an image update package for updating software on the mobile device. In the illustrated embodiment, the process receives the update notification at a mobile device via a first communications path that includes a wireless communication link. In some embodiments, the process receives the update notification at a mobile device from an update server. In some embodiments, the image update package installs a new software platform as a software update for the mobile device.

Next, at block 704, the process activates a secondary authentication module that serves as a replacement for a primary authentication module while the software on the mobile device is being updated. In the illustrated embodiment, the process activates the secondary authentication module as a response to the update notification in preparation for updating software on the mobile device.

Next, at block 706, the process receives an authentication query associated with a user account. In the illustrated embodiment, when the process receives the authentication query, the user has not yet been authenticated to the user account. In the illustrated embodiment, the authentication query includes a user identifier. In the illustrated embodiment, the process receives the authentication query via a second communications path that includes a wireless communication link.

Next, at block 708, the process confirms an association between the user identifier and the mobile device. In the illustrated embodiment, the process confirms the association using the received user identifier in a verification process with user information previously stored on the mobile device. In the illustrated embodiment, the secondary authentication module confirms the association between the user identifier and the mobile device while the software on the mobile device is being updated; otherwise, the primary authentication module confirms the association between the user identifier and the mobile device.

Next, at block 710, the process prompts a user for a confirmation input from the user in connection with the authentication query. In the illustrated embodiment, the user is associated with the user information. In the illustrated embodiment, the secondary authentication module prompts the user for the confirmation input via a user interface while the software on the mobile device is being updated; otherwise, the primary authentication module prompts the user for the confirmation input via the user interface. In the illustrated embodiment, the prompting of the user for the confirmation input is in response to confirming the association between the user identifier and the mobile device.

Next, at block 712, the process receives a user input from the user responsive to the prompting for the confirmation input. In the illustrated embodiment, the secondary authentication module receives the user input while the software on the mobile device is being updated; otherwise, the primary authentication module receives the user input.

Next, at block 714, the process transmits an assertion as a response to the authentication query. In the illustrated embodiment, the process transmits the assertion in response to receiving the user input. In the illustrated embodiment, the secondary authentication module transmits the assertion while the software on the mobile device is being updated; otherwise, the assertion would be transmitted by the primary authentication module. Finally, at block 716, the process deactivates the secondary authentication module. In the illustrated embodiment, the process deactivates the process deactivates the secondary authentication module in response to completing the updating of the software on the mobile device.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
    activating, responsive to receiving an update notification, an update mode of a mobile device,
        wherein the activating of the update mode includes disabling a primary communication interface and enabling a secondary communication interface,
        wherein disabling the primary communication interface includes disabling a primary authentication module,
        wherein the update notification includes notification of a software update available for the mobile device, and
        wherein the activating is further responsive to authenticating a user account using one of:
            (i) the primary authentication module when the primary communication interface is active, wherein the primary authentication module receives an authentication query associated with the user account and
            (ii) a secondary authentication module when the secondary communication interface is active, wherein the secondary authentication module receives the authentication query associated with the user account;
    initiating execution of the software update on the mobile device while the mobile device remains in the update mode; and
    deactivating, responsive to completing the software update, the update mode of the mobile device,
        wherein the deactivating of the update mode includes enabling the primary communication interface and disabling the secondary communication interface, and
        wherein disabling the secondary communication interface includes disabling the secondary authentication module.

2. The computer implemented method of claim 1, wherein the secondary communication interface remains enabled while the update mode is active and the primary communication interface remains inoperable while the update mode is active.

3. The computer implemented method of claim 1, wherein enabling of the secondary communication interface includes issuing a signal from a main processing unit to an Application Specific Integrated Circuit (ASIC) device, wherein the secondary communication interface is contained entirely within the ASIC device, wherein the ASIC device controls the secondary communication interface while the update mode is activated, and wherein the main processing unit controls the primary communication interface while the update mode is deactivated.

4. The computer implemented method of claim 1, wherein the enabling of the secondary communication interface comprises transmitting user authentication data from the primary communication interface to the secondary authentication module.

5. The computer implemented method of claim 1, further comprising:
    confirming an association between the mobile device and a user identifier received with the authentication query based on user information previously stored on the mobile device,
        wherein the confirming of the association comprises confirming the association by the primary authentication module while the primary authentication module is enabled, and
        wherein the confirming of the association comprises confirming the association by the secondary authentication module while the secondary authentication module is enabled.

6. The computer implemented method of claim 5, wherein the confirming of the association includes performing a function on the user identifier by a primary cryptography module while the primary authentication module is enabled,
    wherein the confirming of the association includes performing the function on the user identifier by a secondary cryptography module while the secondary authentication module is enabled, and
    wherein the function is selected from the group consisting of a mathematical transformation, a cryptographic function, and a null function.

7. The computer implemented method of claim 5, further comprising:
    prompting a user associated with the user information with a request for a confirmation input from the user in connection with the authentication query,
        wherein the prompting of the user comprises prompting the user by a primary user interface of the primary authentication module while the primary authentication module is enabled, and
        wherein the prompting of the user comprises prompting the user by a secondary user interface of the secondary authentication module while the secondary authentication module is enabled.

8. The computer implemented method of claim 7, wherein the prompting includes presenting, on a display of the mobile device, a message conveying the request,
    wherein the primary user interface drives the display to present the message while the primary authentication module is enabled, and
    wherein the secondary user interface drives the display to present the message while the secondary authentication module is enabled.

9. The computer implemented method of claim 7, further comprising:
    receiving a user input in response to the request,
        wherein the receiving of the user input comprises receiving the user input by the primary user interface while the primary authentication module is enabled, and
        wherein the receiving of the user input comprises receiving the user input by the secondary user interface while the secondary authentication module is enabled.

10. The computer implemented method of claim 9, wherein the receiving of the user input comprises receiving biometric information about the user via a biometric sensor.

11. The computer implemented method of claim 9, further comprising:
    transmitting an assertion in response to the authentication query,
        wherein the transmitting of the assertion comprises transmitting the assertion by the primary communication interface while the primary authentication module is enabled, and
        wherein the transmitting of the assertion comprises transmitting the assertion by the secondary communication interface while the secondary authentication module is enabled.

12. The computer implemented method of claim 11, wherein the transmitting of the assertion comprises transmitting the assertion by the primary communication interface while the primary authentication module is enabled, and
    wherein the transmitting of the assertion comprises transmitting the assertion by the secondary communication interface while the secondary authentication module is enabled.

13. A computer program product comprising one or more computer readable storage media, and program instructions collectively stored on the one or more computer readable storage media, the program instructions executable by a processor to cause the processor to perform operations comprising:

activating, responsive to receiving an update notification, an update mode of a mobile device, wherein the activating of the update mode includes disabling a primary communication interface and enabling a secondary communication interface, wherein disabling the primary communication interface includes disabling a primary authentication module, wherein the update notification includes notification of a software update available for the mobile device, and wherein the activating is further responsive to authenticating a user account using one of:

(i) the primary authentication module when the primary communication interface is active, wherein the primary authentication module receives an authentication query associated with the user account and (ii) a secondary authentication module when the secondary communication interface is active, wherein the secondary authentication module receives the authentication query associated with the user account;

initiating execution of the software update on the mobile device while the mobile device remains in the update mode; and deactivating, responsive to completing the software update, the update mode of the mobile device, wherein the deactivating of the update mode includes enabling the primary communication interface and disabling the secondary communication interface, and wherein disabling the secondary communication interface includes disabling the secondary authentication module.

14. The computer program product of claim 13, wherein the stored program instructions are stored in computer readable storage media in a data processing system, and wherein the stored program instructions are transferred over a network from a remote data processing system.

15. The computer program product of claim 13, wherein the stored program instructions are stored in computer readable storage device in a server data processing system, and wherein the stored program instructions are downloaded in response to a request over a network to a remote data processing system for use in computer readable storage media associated with the remote data processing system, further comprising:

program instructions to meter use of the program instructions associated with the request; and program instructions to generate an invoice based on the metered use.

16. A computer system comprising a processor and one or more computer readable storage media, and program instructions collectively stored on the one or more computer readable storage media, the program instructions executable by the processor to cause the processor to perform operations comprising:

activating, responsive to receiving an update notification, an update mode of a mobile device, wherein the activating of the update mode includes disabling a primary communication interface and enabling a secondary communication interface, wherein disabling the primary communication interface includes disabling a primary authentication module, wherein the update notification includes notification of a software update available for the mobile device, and wherein the activating is further responsive to authenticating a user account using one of:

(i) the primary authentication module when the primary communication interface is active, wherein the primary authentication module receives an authentication query associated with the user account and (ii) a secondary authentication module when the secondary communication interface is active, wherein the secondary authentication module receives the authentication query associated with the user account;

initiating execution of the software update on the mobile device while the mobile device remains in the update mode; and deactivating, responsive to completing the software update, the update mode of the mobile device, wherein the deactivating of the update mode includes enabling the primary communication interface and disabling the secondary communication interface, and wherein disabling the secondary communication interface includes disabling the secondary authentication module.

* * * * *